United States Patent [19]

Jones et al.

[11] Patent Number: 5,642,515
[45] Date of Patent: Jun. 24, 1997

[54] NETWORK SERVER FOR LOCAL AND REMOTE RESOURCES

[75] Inventors: Donald Newland Jones, Vestal; Robert Alois Kalka, Jr., Endicott, both of N.Y.

[73] Assignee: International Business Machines Corporation, Armonk, N.Y.

[21] Appl. No.: 870,026

[22] Filed: Apr. 17, 1992

[51] Int. Cl.⁶ .............................. G06F 9/46; G06F 13/14
[52] U.S. Cl. ................ 395/727; 395/182.03; 395/200.09
[58] Field of Search ................................. 395/200, 325, 395/650, 725, 600, 800, 200.01–200.11, 300, 727, 728–732, 182.03, 182.18

[56] References Cited

U.S. PATENT DOCUMENTS

| | | | |
|---|---|---|---|
| 4,780,821 | 10/1988 | Crossley | 395/325 |
| 4,800,488 | 1/1989 | Agrawal et al. | 395/800 |
| 4,868,763 | 9/1989 | Masui et al. | 364/513 |
| 4,893,307 | 1/1990 | McKay et al. | 370/94.1 |
| 4,897,874 | 1/1990 | Lidinsky et al. | 380/3 |
| 4,901,231 | 2/1990 | Bishop et al. | 95/325 |
| 4,914,619 | 4/1990 | Harris et al. | 395/200 |
| 4,937,784 | 6/1990 | Masai et al. | 395/325 |
| 4,941,089 | 7/1990 | Fischer | 395/325 |
| 4,961,224 | 10/1990 | Yung et al. | 380/25 |
| 5,005,122 | 4/1991 | Griffin et al. | 395/200 |
| 5,014,221 | 5/1991 | Mogul | 364/519 |
| 5,019,963 | 5/1991 | Alderson et al. | 395/600 |
| 5,113,499 | 5/1992 | Ankney et al. | 395/725 |
| 5,136,708 | 8/1992 | Lapourtre et al. | 395/650 |
| 5,163,131 | 11/1992 | Row et al. | 395/200 |
| 5,218,697 | 6/1993 | Chung | 395/650 |
| 5,220,674 | 6/1993 | Morgan et al. | 395/800 |
| 5,249,290 | 9/1993 | Heizer | 395/650 |
| 5,249,291 | 9/1993 | Williams | 395/650 |

FOREIGN PATENT DOCUMENTS

| | | |
|---|---|---|
| 408391 | 1/1991 | European Pat. Off. . |
| 02292927 | 12/1990 | Japan . |
| 9103788 | 3/1991 | WIPO . |

OTHER PUBLICATIONS

IBM TDB, vol. 34, No. 8, Jan. 1992, "Home Terminal Access to LAN Servers Utilizing Host Connection", M.D. Smith, pp. 382–383.
IBM TDB, vol. 29, No. 8, Jan. 1987, "Communication Method Among Asynchronous Processors In A Distributed System", pp. 3278–3279.

*Primary Examiner*—Tariq R. Hafiz
*Attorney, Agent, or Firm*—Arthur J. Samodovitz

[57] ABSTRACT

A network server permits clients on the network to access one or more local resources managed by the network server and one or more remote resources managed by one or more respective remote computers coupled to the network server. When a client desires to access any of the resources, the client first requests a session or log-on to the network server by supplying a valid account name and password. Either with the session establishment request or subsequently during the same session, the client requests a connection or access to a resource. The client need not know the location of the resource or the computer (remote or network server) which manages the resource. The network server determines which computer manages the requested resource. If the network server manages the resource, then the network server determines if the connection is available or provides the access as requested and responds to the client. Then, if the client subsequently requests a connection with or access to a resource managed by a remote computer, or if the original request was for a resource managed by the remote computer, the network server sends a session establishment request and connect or access request to the remote computer. The client need not send a separate session establishment request for the remote computer. If the remote computer grants the session, then the client can access the resource managed by the remote computer.

36 Claims, 18 Drawing Sheets

FIG.2(a)a

| FIG.2(a)a | FIG.2(a)b |

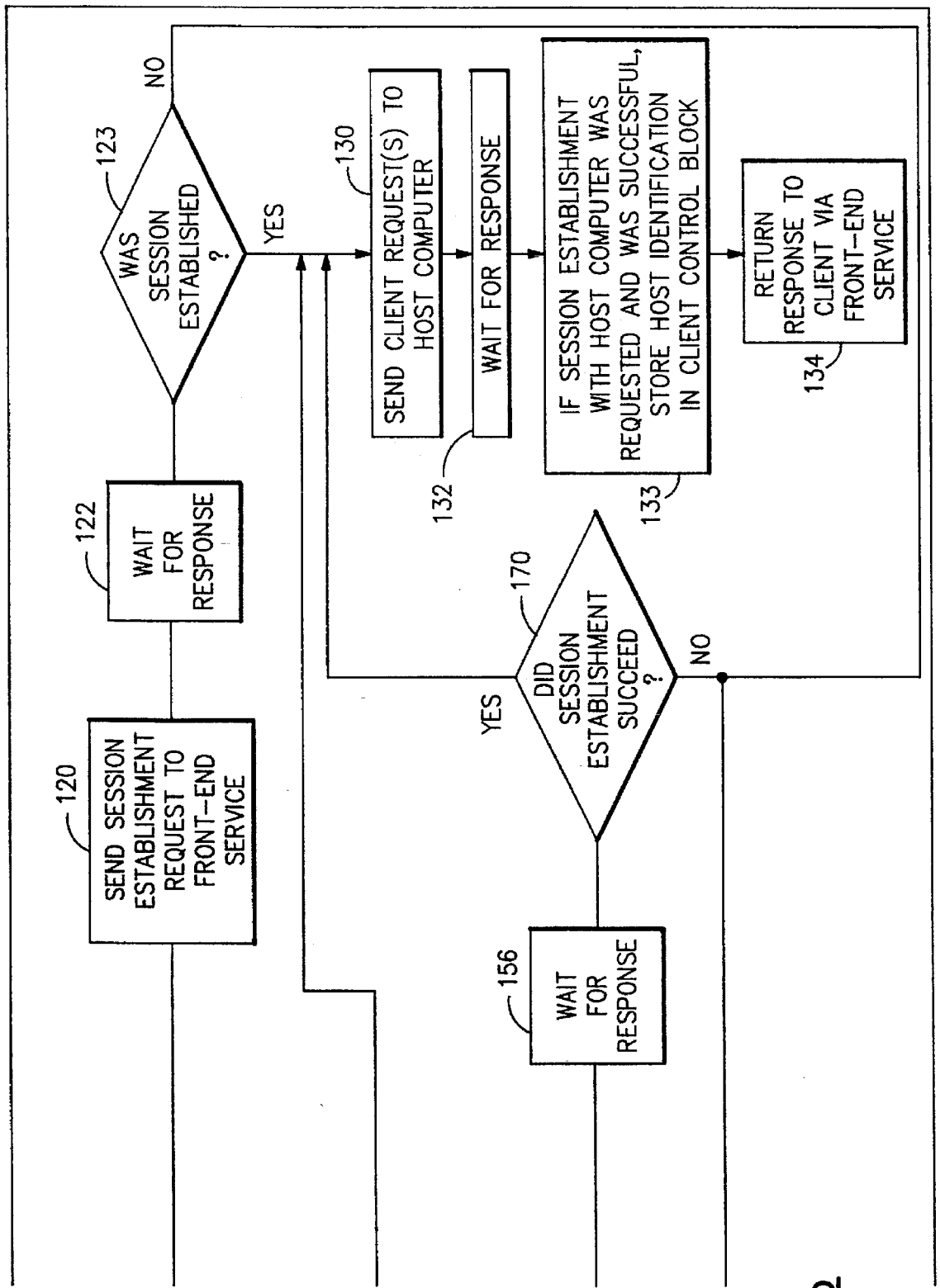
FIG.2(a)b

| CLIENT | FRONT-END SERVICE | BACK-END SERVICE | HOST COMPUTER 30 | HOST COMPUTER 34 |
|---|---|---|---|---|
| ISSUE SESSION ESTABLISHMENT REQUEST WITH CONNECT REQUEST TO RESOURCE MANAGED BY FRONT-END SERVICE 310 | | | | |
| | TRANSFER CLIENT REQUEST TO BACK-END SERVICE | 110, 116 | | |
| | 314 | SAVE SESSION ESTABLISHMENT INFORMATION, TRANSFER BACK TO FRONT-END SERVICE | | |
| | DO ACCOUNT VALIDATION, PROCESS CONNECT REQUEST, NOTIFY BACK-END SERVICE OF VALIDATED ACCOUNT, RETURN RESPONSE | | | |

| CLIENT | FRONT-END SERVICE | BACK-END SERVICE | HOST COMPUTER 30 | HOST COMPUTER 34 |
|---|---|---|---|---|
| | | RETRIEVE SAVED SESSION ESTABLISHMENT INFORMATION AND PASS TO HOST COMPUTER 30, AND WAIT FOR RESPONSE | | |
| | | 152,156 | 324 | |
| | | | DO ACCOUNT VALIDATION AND RETURN RESPONSE | |
| | | 130,132 | | |
| | | PASS CONNECT REQUEST TO HOST COMPUTER 30 AND WAIT FOR RESPONSE | 326 | |
| | | | PROCESS CONNECT REQUEST AND RETURN RESPONSE | |
| | | 134 | | |
| | | RETURN RESPONSE TO CLIENT CONNECT REQUEST | | |
| | RETURN RESPONSE | | | |
| STATUS: REQUEST COMPLETED | | | | |

FIG.3(b)a

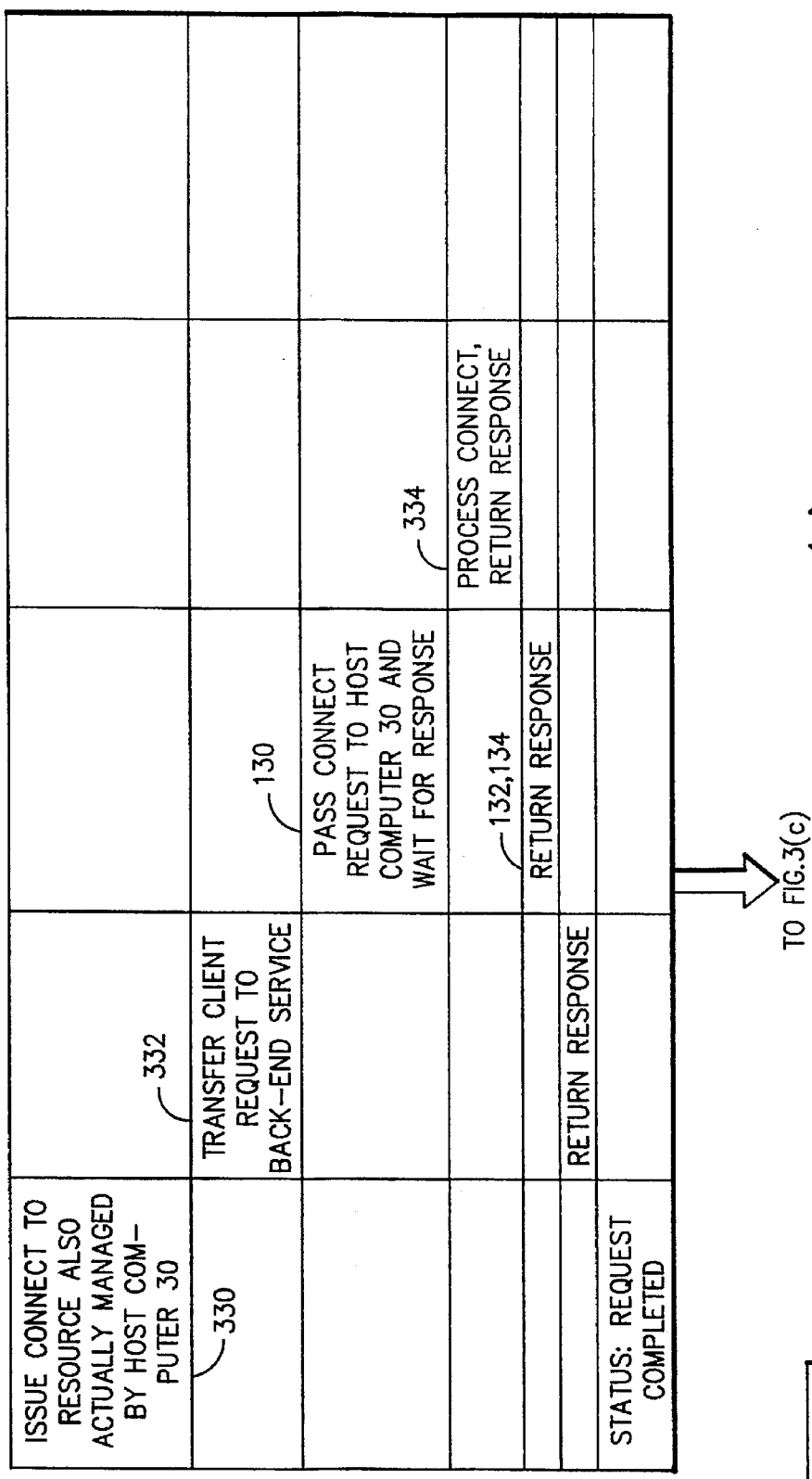

| CLIENT | FRONT-END SERVICE | BACK-END SERVICE | HOST COMPUTER 30 | HOST COMPUTER 34 |
|---|---|---|---|---|
| TERMINATE SESSION 350 | NOTIFY BACK-END SERVICE OF SESSION TERMINATION AND TERMINATE SESSION ON NETWORK SERVER. 352 | | HOST COMPUTER 30 USER 344 LINKS TO MINIDISK THAT IS ALSO BEING USED AS A RESOURCE BY LAN CLIENTS ATTACHED TO THIS HOST COMPUTER VIA THE FRONT-END /BACK-END SERVICE, AND ADDRESS FILE AND DIRECTORY BY NAME. HOST COMPUTER USER THEN PERFORMS NORMAL FUNCTIONS (E.G. OPEN, READ, WRITE, CLOSE, DELETE) ON FILES ON THIS MINIDISK. | |
| | | BUILD SESSION TERMINATION NOTIFICATION AND PASS TO EACH CONNECTED HOST COMPUTER | | |
| | | | PROCESS SESSION TERMINATION NOTIFICATION 354 | PROCESS SESSION TERMINATION NOTIFICATION 356 |

FIG.3(d)

| CLIENT | FRONT-END SERVICE | BACK-END SERVICE | HOST COMPUTER 30 | HOST COMPUTER 34 |
|---|---|---|---|---|
| ISSUE SESSION ESTABLISHMENT REQUEST WITH CONNECT REQUEST TO RESOURCE MANAGED BY HOST COMPUTER 30<br>410 | | | | |
| | TRANSFER CLIENT REQUEST TO BACK-END SERVICE<br>412 | | | |
| | | 110,120,122 | | |
| | | SAVE SESSION ESTABLISHMENT INFORMATION, TRANSFER BACK TO FRONT-END SERVICE | | |
| | DO ACCOUNT VALIDATION, TRANSFER CONTROL TO BACK-END SERVICE AND NOTIFY IT OF VALIDATED ACCOUNT<br>414 | | | |

| CLIENT | FRONT-END SERVICE | BACK-END SERVICE | HOST COMPUTER 30 | HOST COMPUTER 34 |
|---|---|---|---|---|
| STATUS: REQUEST COMPLETED AND SESSION ESTABLISHED | | | | |
| ISSUE CONNECT WITHIN SESSION TO RESOURCE MANAGED BY FRONT-END SERVICE —420 | TRANSFER CLIENT REQUEST TO BACK-END SERVICE —422 | | | |
| | | NOTE THAT CLIENT REQUEST IS NOT FOR BACK-END SERVICE, SO TRANSFER CONTROL TO FRONT-END SERVICE —116 | | |
| | PROCESS CONNECT REQUEST, RETURN RESPONSE —424 | | | |
| STATUS: REQUEST COMPLETED | | | | |

FIG.4(b)a

| TERMINATE SESSION | | | |
|---|---|---|---|
| 430 | NOTIFY BACK-END SERVER OF SESSION TERMINATION AND TERMINATE SESSION ON NETWORK SERVER. | | |
| | | BUILD SESSION TERMINATION NOTIFICATION AND PASS TO EACH CONNECTED HOST COMPUTER | |
| | | | PROCESS SESSION TERMINATION NOTIFICATION |

| CLIENT | FRONT-END SERVICE | BACK-END SERVICE | HOST COMPUTER 30 | HOST COMPUTER 34 |
|---|---|---|---|---|
| ISSUE SESSION ESTABLISHMENT REQUEST TO INTER- MEDIATE SERVER 510 | | | | |
| | TRANSFER CLIENT REQUEST TO BACK-END SERVICE 512 | 110,116 | | |
| | | SAVE SESSION ESTABLISHMENT INFORMATION, TRANSFER BACK TO FRONT-END SERVICE | | |
| | DO ACCOUNT VALI- DATION, NOTIFY BACK-END SERVICE OF VALIDATED ACCOUNT, RETURN RESPONSE 514 | | | |
| | | NOTE CONFIRMATION OF ACCOUNT VALI- DATION | | |
| STATUS: REQUEST COMPLETED AND SESSION ESTAB- LISHED | | | | |

FIG.5(a)a

| CLIENT | FRONT-END SERVICE | BACK-END SERVICE | HOST COMPUTER 30 | HOST COMPUTER 34 |
|---|---|---|---|---|
| | | PASS CONNECT REQUEST TO HOST COMPUTER 34 AND WAIT FOR RESPONSE ⎯130,132 | | PROCESS CONNECT REQUEST AND RETURN RESPONSE ⎯524 |
| | RETURN RESPONSE | RETURN RESPONSE TO CLIENT CONNECT REQUEST ⎯134 | | |
| STATUS: REQUEST COMPLETED | | | | |
| TERMINATE SESSION ⎯530 | NOTIFY BACK-END SERVICE OF SESSION TERMINATION AND TERMINATE SESSION ON NETWORK SERVER. ⎯532 | BUILD SESSION TERMINATION NOTIFICATION AND PASS TO EACH CONNECTED HOST COMPUTER | | PROCESS SESSION TERMINATION NOTIFICATION ⎯534 |

FIG.5(b)

NETWORK SERVER FOR LOCAL AND REMOTE RESOURCES

BACKGROUND OF THE INVENTION

The invention relates generally to computer networks, and deals more particularly with a network server that permits a network client to access a local resource coupled directly to the network server and a remote resource coupled to a host computer.

A previously known local area network (LAN) is used to interconnect multiple personal computers or work stations, called "clients", and a network server. The network server comprises a personal computer and a program which provides a variety of services to the clients. For example, the server manages a local disk (DASD) and permits selected (or all) clients on the LAN to access the disk. Also, the server may provide access by LAN clients to a local printer that the server manages. To access the local disk, the client must first establish a session or "log-on" to the server with a valid account and password and request a connection to the local disk. In response, the server validates the account and password, and grants the connection if available. Then, the client requests a remote file operation (e.g. open, read, write, close) and furnishes associated parameters. In response, the server may copy (depending on the operation) the file from the local disk into RAM, and performs the operation requested by the client. If the file is updated, the server will copy the updated version back to the local disk, overwriting the previous version.

A previously known IBM LANRES/VM computer system comprises a LAN, a network server and a remote disk driver (with a remote disk) coupled to the network server. The remote disk driver is in the form of a System/370 host computer; however, the System/370 computer is not used as a computer for service to the network server, but merely as a disk driver for the remote disk. The network server maintains a list of all resources that the network server can access, i.e. the local disk, the remote disk, all directories on the local disk and all directories on the remote disk, and a table or pointers to map each directory and file within the directory to the storage location on the corresponding disk. The clients do not know where the requested resource resides. To access any of the resources, a client on the LAN must establish a session with or log-on to the network server with a valid account and password, request a connection to a named resource and provide a remote file operation/command and associated parameters. In response, the network server validates the account and password, determines the location of the named resource and then translates the directory name into specific addresses on the disk. If the file is located on the local disk, then the network server fetches the directory from the addresses and then performs the operation requested by the client. (The client may subsequently request access to a file within the directory.) If the file is located on the remote disk, then the server provides to the remote disk driver the specific addresses of the directory on the remote disk to be written to or read from and the write or read command. It should be noted that the network server cannot address the remote disk by a directory (or file) name, and the disk driver does not provide the security associated with a log-on requirement. Also, because the data cannot be accessed by a directory (or file) name or as any discernible entity, it is not possible for another application program which executes on the System/370 computer to access the directory or file; this other application program does not know the location of the directory or file. Nevertheless, there is an important advantage to this LANRES/VM computer system. As noted above, the client need not know the actual location of the disk; the disk can be local to the network server or connected to the remote disk driver. In this respect, the server is "transparent" to the client.

A general object of the present invention is to provide a network server which permits a client on a network to access a local resource managed by the network server and a remote resource managed by a host computer, which host computer provides host computer services relating to the remote resource.

Another object of the present invention is to provide a network server of the foregoing type which permits a client to access both a local resource and a remote resource without knowing the location of either.

Still another object of the present invention is to provide a network server of the foregoing type which permits an application program executing on the host computer to access the same directories and files on the remote resource that the clients can access.

A more specific object of the present invention is to provide a network server of the foregoing type in which the host computer provides security for the remote resource.

Another specific object of the present invention is to provide a network server of the foregoing type which permits a client to access remote resources managed by different host computers, and to do so efficiently.

SUMMARY OF THE INVENTION

The invention resides in a network server that permits clients on the network to access one or more local resources managed by the network server and one or more remote resources managed by one or more respective remote computers coupled to the network server.

When a client desires to access any of the resources, the client first requests a session or log-on to the network server by supplying an account name and/or password. If the account name and/or password are valid, the network server establishes a session with the client. Either with the session establishment request or subsequently during the same session, the client requests a connection or access to a resource. The client need not know the location of the resource or the computer (remote or network server) which manages the resource, and does not specify the location in the request. The network server determines which computer manages the requested resource. If the network server manages the resource, then the network server determines if the connection is available or provides the access as requested and responds to the client. Then, if the client subsequently requests a connection with or access to a resource managed by a remote computer, or if the original request was for a resource managed by the remote computer, the network server sends a session establishment request and connect or access request to the remote computer. The client need not send a separate session establishment request for the remote computer. The remote computer then accepts or rejects the session establishment request based on security information stored in the remote computer for this client. If the session with the remote computer is established, then the client can access the resource managed by the remote computer. For efficiency, the other remote computers are not informed of the session or otherwise interrupted.

According to one feature of the present invention, an application program executing on the host computer can also access the same remote resource managed by the host computer that the clients can access.

BRIEF DESCRIPTION OF THE FIGURES

FIG. 1 also illustrates remote DASDs which are managed by the remote computers and which the clients can access via the network server.

FIGS. 5(a) and 5(b) form a flow chart illustrating still other examples of operation of the network server and host computers of FIG. 1 in response to still other specific requests by the clients.

DETAILED DESCRIPTION OF THE PREFERRED EMBODIMENTS

Figure 1:
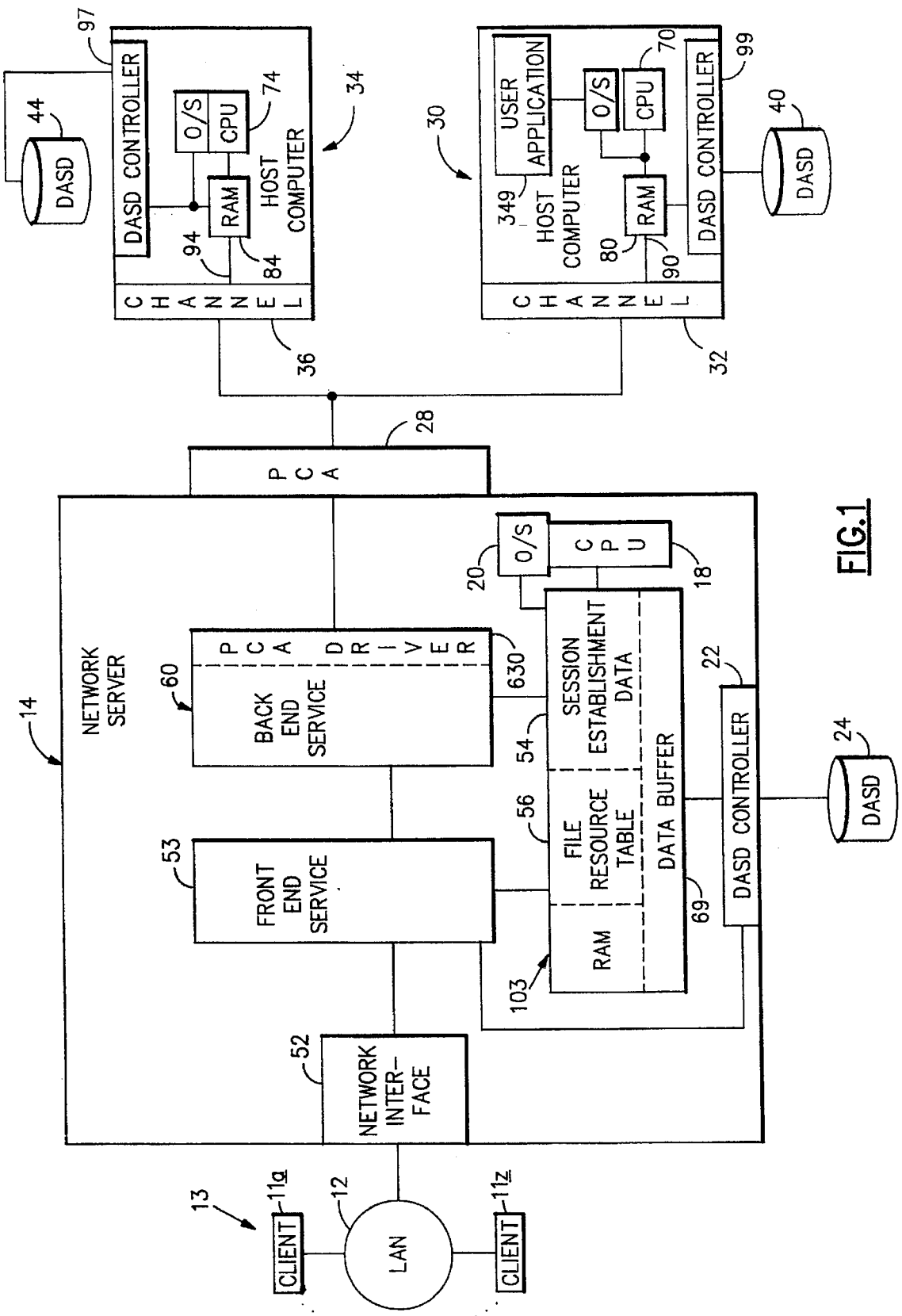
FIG. 1 is a block diagram of a network server according to the present invention, a local DASD, a network of clients which can access the local DASD via the network server, and remote computers coupled to the network server.

Referring now to the drawings in detail wherein like reference numerals indicate like elements throughout the several views, FIG. 1 illustrates a computer network generally designated 10 which includes many previously known clients 11a–z coupled together by a previously known communication link 12 to form a LAN 13, and a network server 14 according to the present invention. By way of example, each of the clients comprises a personal computer or a workstation which executes a DOS Lan Requestor, OS/2 LAN Requestor, PC LAN Program or LANMAN For DOS client program, and a Token-Ring or Ethernet adapter card to interface the personal computer or workstation to the other clients and the network server via the communication link. The network server 14 comprises a previously known personal computer such as an IBM PS/2 personal computer with a processor 18 (although the network server could also execute in a multiprocessor environment), an OS/2 operating system 20, a DASD controller 22 for local DASD 24, and a Token-Ring or Ethernet adapter card. For further details of the PS/2 computer, reference can be made to the following document which is available from International Business Machines Corp. in Mechanicsburg, Pa.: "IBM PS/2 Reference Guide", G360-2669. The network server 14 also comprises a previously known parallel channel adapter (PCA) card 28 to permit the network server to communicate with a host computer 30 via an associated channel 32, and with a host computer 34 via an associated channel 36. By way of example, each of the host computers comprises a previously known IBM System/370 or System/390 computer and each of the channels comprises an IBM Block Multiplexor channel. The host computers 30 and 34 provide basic computer functions such as security and management of respective DASDs 40 and 44. For further details of the host computers 30 and 34 and channels 32 and 36, reference can be made to the following documents which are available from International Business Machines Corp. in Mechanicsburg, Pa.: "System/370 Principles of Operation" publication number GA22-7000, and "ESA/390 Principles of Operation" publication number SA22-7201.

Figure 2A:
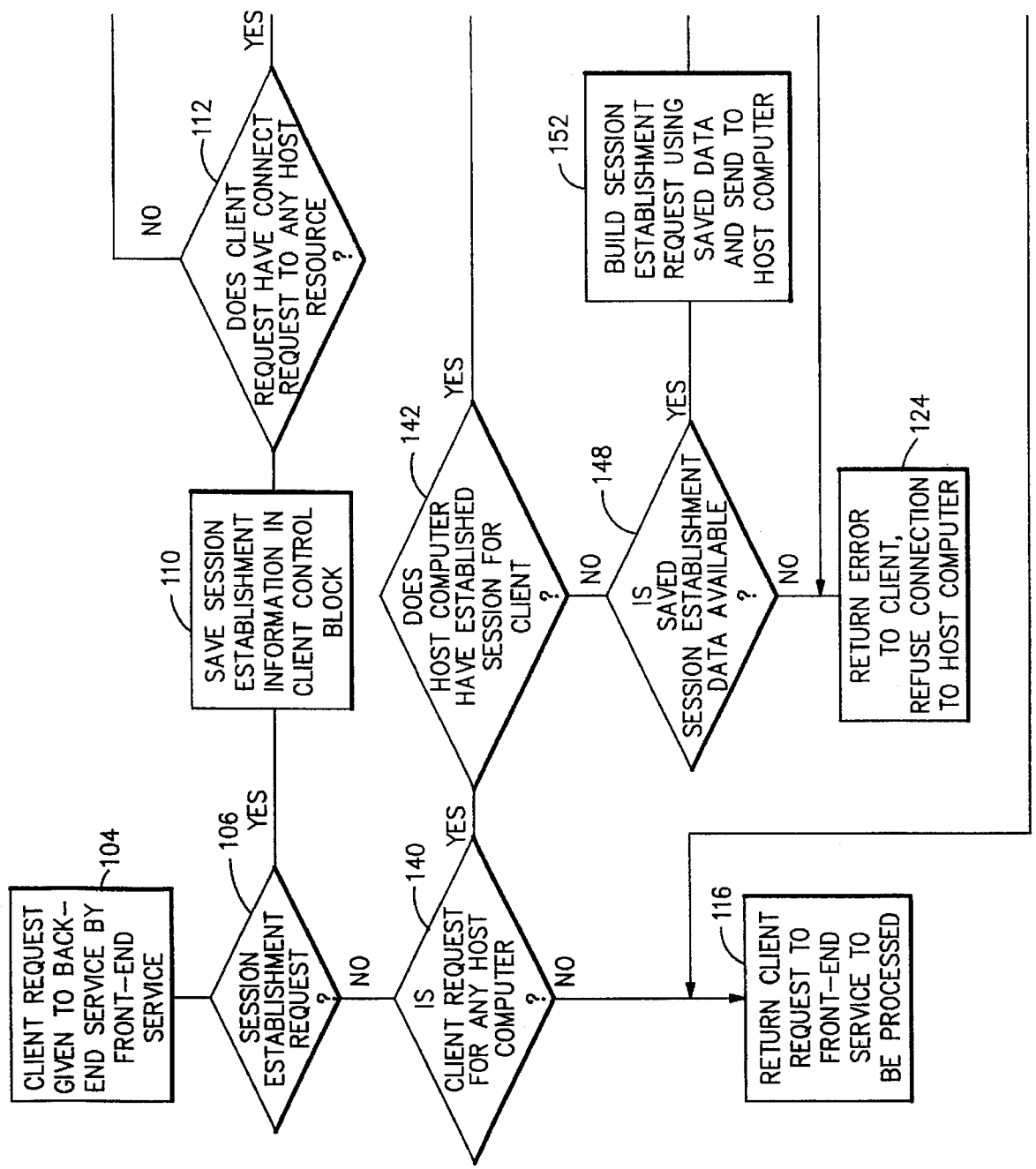
FIGS. 2(a) and 2(b) are flow charts illustrating general operation of a back end service program within the network server of FIG. 1.

FIGS. 2(a) and (b) illustrate operation of network server 14 according to the present invention to permit any of the clients 11a–z to access the local DASD 24, remote DASD 40 and remote DASD 44. When a client 11a–z is initiated or subsequently when the client desires to access a directory or file on local DASD 24, remote DASD 40 or remote DASD 42, the client requests a session with or log-on to the network server 14. This request involves registration and authentication of an account name for the client, and requires a valid account name, password and other parameters as follows:

Client Maximum Buffer Size
Actual Maximum Multiplexed Pending Requests
Virtual Circuit Number—when a client establishes a communications link with a network server, that link is given a number to identify it uniquely. This is that number.
Session Key
Account Password Length
Account Password
Account Name
Consumer Maximum Buffer Size At the time of making the session establishment request or subsequently, the client may request a connection to a resource such as a directory by name. However, the client could have requested a connection to other types of resources, for example, an entire data repository such as one of the DASDs, a part of a data repository such as a minidisk, a printer (not shown), or another data entity such as a file. The connect request is a request to determine if the resource is available and if the requestor is authorized to access the resource. The client need not know the location of the resource or which computer 14, 30 or 34 manages the resource. The connect request usually precedes another command to actually read from or write to the resource. By way of example, all requests from the clients use a server message block (SMB) or Network File System (NFS) Remote Procedure Call (RPC) protocol, which are further defined in documents entitled "Microsoft Networks/OpenNET File Sharing Protocol", Intel Part Number 138446 Version 1.9, Apr. 21, 1987, Microsoft Corporation, Intel Corporation; "Microsoft Networks SMB FILE SHARING PROTOCOL EXTENSIONS: SMB File Sharing Protocol Extensions Version 2.0", Document Version 3.2, Jul. 13, 1988, Microsoft Corporation; and "Microsoft Networks SMB FILE SHARING PROTOCOL EXTENSIONS: SMB File Sharing Protocol Extensions Version 3.0", Document Version 1.09, Nov. 29, 1989, Microsoft Corporation for SMB Protocol, and Internet RFC 1057, Sun Microsystems, Inc., June 1988 for NFS Protocol.

A network interface 52 within network server 14 receives the request(s), associates the request with the appropriate client and session, determines the correct process to receive the request, and then passes the request(s) to a front end service program 53. The front end service program passes this request(s) (and all client requests), without change, to a back end service program 60. (The front end service program and back end service program are both executed by processor 18 after being loaded or read from a magnetic disk or tape into RAM 103). When the back end service program receives the request (step 104), the back end service program determines if the request includes a session establishment request (decision block 106). If so, the back end service stores in a session establishment data table 54 the foregoing information from the client request and the following information which the front end service and the back end service generate (step 110):

(Front end Service Generated)

Session Structure Pointer—when a client session establishment requests is received by a network server, the network server associates this request with a control block of information about that client. This field is the address of that control block. Once the session is established, the network server sets a bit to indicate that this session is active.

Session Encryption Key Length
Session Encryption Key
Remote Client Name Length—the length of the remote client name.
Remote Client Name—this is the address of a block of storage that contains the machine name of the client that has/is attempting to establish a session with this network server. This address comes from the session structure.

(Back End Service Generated)

Account Name Length
Session Next Pointer—next instance of this structure based on session structure pointer—linked list.
Session Previous Pointer
Structure Next Pointer—next instance of this structure for any session—linked list.
Structure Previous Pointer
Structure Flags This information forms a client control block.

Next, the back end service determines if the request includes a connect request, and if so, is the resource for which connection is requested stored within a remote DASD (or other external device) managed by either host computer 30 or 34 (decision block 112). The latter determination is made by reading a resource table 56 to identify the location of the DASD or other external device that stores the file. If there is no such request to connect to resource managed by either remote DASD 40 or 44, then the back end service returns the client request to the front end service for processing. The front end service then determines if the account and password are valid by comparing them to lists of valid accounts and passwords, respectively. If the account and password are valid, the front end service establishes a session with the client by setting a flag in the session structure pointer field in the control blocks. Then the front end service notes the existence of the session in an active session table and returns a session establishment acknowledgement to the client via the network interface and to the back end service (step 116). If the request also includes a connect request for a resource managed by the network server such as a directory stored in local DASD 24, then the front end service also checks the status of the connection, and reports the outcome to the client. If the password is not valid, or if the session cannot be established for some other reason (such as a limit on the number of sessions allocated to each resource), then the front end service returns a session refusal message to the client (step 116).

Referring again to decision block 112, if the client request includes a request to connect to a resource managed by remote computer 30 or remote computer 34 such as remote DASD 40 or remote DASD 44, respectively, then the back end service passes the session establishment request to the front end service (step 120), and waits for a return acknowledging session establishment with the network server (step 122). The front end service then determines if the session can be established (i.e. valid account and password, no other problems), and sends the response to the back end service. If the session is not successfully established (decision block 123), then the back end service sends an error message to the client via the front end service, refusing the session (step 124). However, if the session is successfully established, then the back end service sends the entire client request including the session establishment request and the connect request to the one host computer which manages the resource for which connection is requested (step 130), and waits for a response (step 132). It should be noted that the form of the session establishment request and connect request sent to the host computer by the network server in step 130 can be the same as that sent to the network server by the client. However, it may be necessary to provide a mapping between user/client ID, resource connection ID and file ID between that provided by the network server and that required by the remote computer. When the response is received from the host computer indicating whether the session was established and the connection is available, the back end service stores an identifier for this host computer in the client control block (step 133), and passes the response to the front end service (step 134), then the front end service passes the response to the client via the network interface 52. The form of the session establishment response originating from the host computer and sent to the client after step 134 can be the same as that sent to the client after step 116 when there was no connect request to either host computer. If it is not identical, the network server alters the format suitably. Consequently, the client does not know the origin of the session establishment response or connect response, and assumes that the client now has access to any resource available from the network server. To support this assumption, the network server, as described below, will subsequently request session establishment on behalf of the client with any other remote computer connected to the network server when and if the client requests access to a resource managed by this other remote computer. The client need not request session establishment again during the course of the session that was just established after steps 120 and 130. This makes the network server transparent to the clients, yet there is no burden ever (for session establishment) on any host computer that does not manage a resource for which the client requests a connection.

Subsequently, the client sends a request to the network server to access a named resource (assume the one for which a connect request was previously sent). The client need not know the location of the resource or computer which manages the resource, and does not specify the location in the request. The front end service receives the request via the network interface, and passes the request to the back end service (step 104). Because this request is a resource access request and not a session establishment request (decision block 106), the back end service next determines if the named resource is managed by either remote computer 30 or 34 (decision block 140). This determination is made by reading the resource table 56. If the named resource is instead managed by network server 14 (for example, stored on local DASD 24), then the back end service passes the request to the front end service for processing (step 116). For a read request, the front end service reads the directory from local DASD 24 into data buffer 69, and then sends the directory to the client for storage in the client's RAM. For a write request, the front end service writes the data supplied with the write command into data buffer 60 and then into the directory within local DASD 24. Other types of requests are handled in an appropriate manner.

Referring again to decision block 140, if the named resource is managed by either remote computer 30 or 34 (for example, stored on either remote DASD 40 or remote DASD 44), the back end service determines that a session was previously established and is currently active for this client with the host computer that manages the requested resource (decision block 142). This determination is made by reading the active session table 57. Then, the back end service sends the resource access request to the host computer (step 130) and then waits for a response (step 132). If the resource access request is a read request, then the host computer will read the resource from the remote DASD into host RAM, and send the resource to the data buffer 60, and the back end service will send the data to the client via the front end service (step 134). If the resource access request is a write request, the host computer will write the data into the remote DASD, and respond to the client via the front end service with an acknowledgement in step 134.

The client can also send a request to connect to another resource which is managed by the (or any) other host computer.

Referring again to decision block 142, if there is not yet a session established with this other host computer that manages the requested resource, then the back end service determines if session establishment data has been saved for this client by reading the session establishment data table 54 (decision block 148). If not, (which means that there is not an active session with the network server), then the back end service responds to the client via the front end service with an error signal and refuses connection to the host computer (step 124). (The client can now request a session establishment, and the flow chart of FIG. 2 will proceed as described above for steps 104, 106, 110 etc.)

Referring again to decision block 148, if the session establishment data has been saved for this client (meaning that there is currently an active session with at least the network server), the back end service builds a session establishment request based on the session establishment data stored in the table 54 and sends the request to this other host computer (step 152). It should be noted that in accordance with an object of the present invention, the client itself is not burdened with establishing a session with the host computer or even knowing that a host computer manages the requested resource. It should also be noted that the back end service establishes sessions only with those host computer(s) that manage resources for which connection or access has been requested, and the other host computer(s) are not interrupted. This maximizes efficiency.

After sending the session establishment request, the back end service waits for a response (step 156) from the host computer. The host computer will then determine if the session should be established based on the account name, password and other information, and respond with a session establishment acknowledgement or refusal to the back end service. If the session with this client has been established (decision block 170), then the back end service will send the resource connection to the host computer (step 130), and then execute steps 132, 133 and 134 as described above. The client can then follow with a resource access request. Referring again to decision block 170, if the host computer refuses to establish the session, then the back end service will pass the error message and refusal to the client via the front end service (step 124).

Figure 2B:
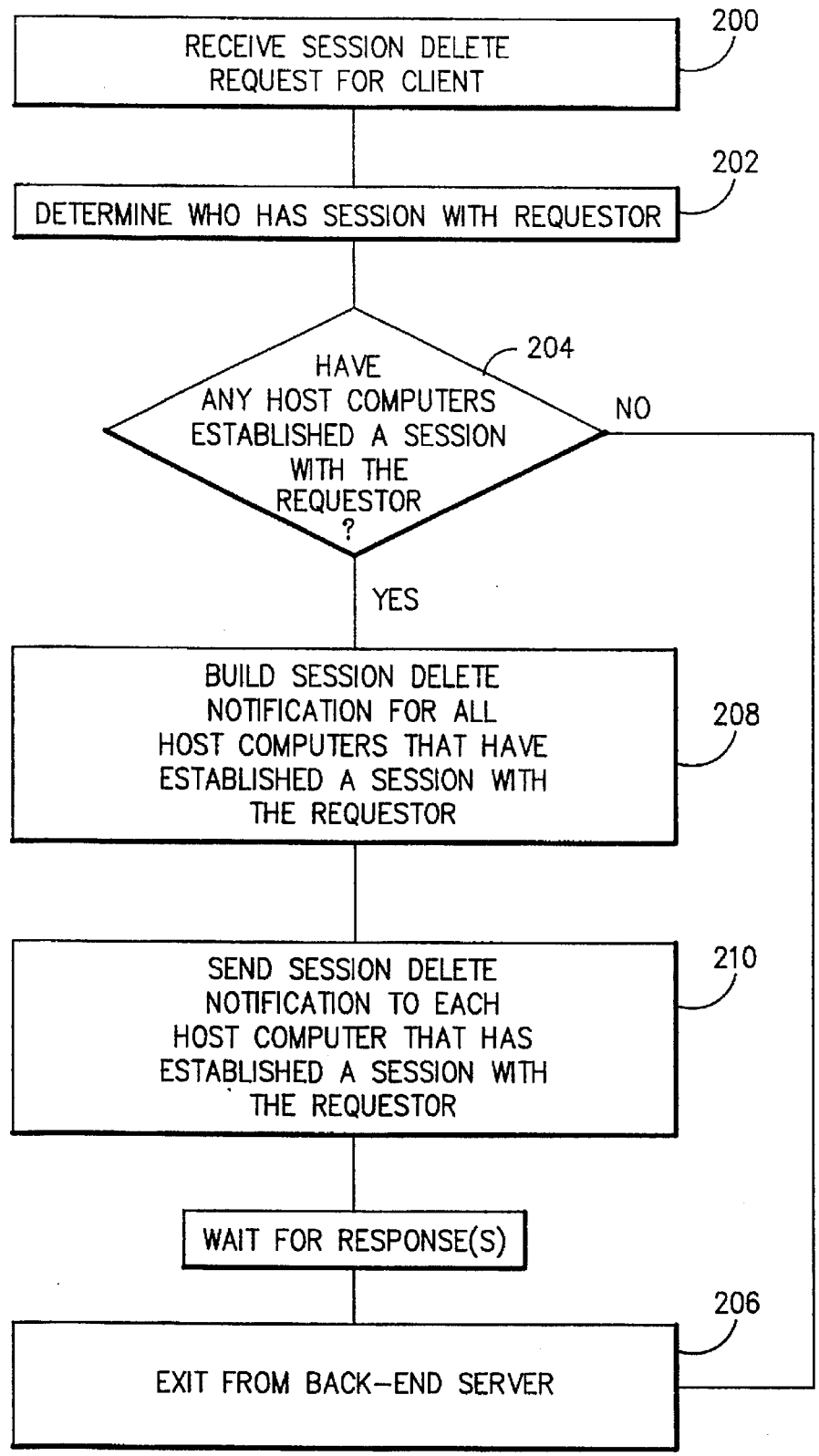

FIG. 2(b) illustrates another portion of the back end service program which handles requests to terminate sessions. The requests can originate from either a client 11a–z or be initiated by administrative action on the network server (or indirectly by administrative action from the remote computer(s)), and includes a session structure pointer parameter.

The front end service receives this request, passes this request to an entry point in the back end service program corresponding to step 200, and processes the deleted session with the client by ending all work in progress by that client, and performing any needed cleanup. Then, the back end service reads the session establishment data table 54 to determine which of the network server, host computer 30 and host computer 34 have established a session with the requesting client (step 202). If neither of the host computers 30 nor 34 (nor any other host computer) has established a session with the requesting client (decision block 204), then the back end service returns control to the front end service (step 206), which terminates its processing of this request. However, if either of the host computers 30 or 34 has established a session with the requesting client, then the back end service builds a session delete notification (step 208) and sends the notification to all host computers that have established a session with the requesting client (step 210). The session delete notification includes the host identifier parameter that was stored in step 133.

The notified host computers proceed to delete the session by ending all work associated with the user and performing any needed cleanup, and then return acknowledgements to the back end service which is waiting (step 212). Then, the back end service returns control to the front end service, which terminates its processing of this request.

Figure 3A:
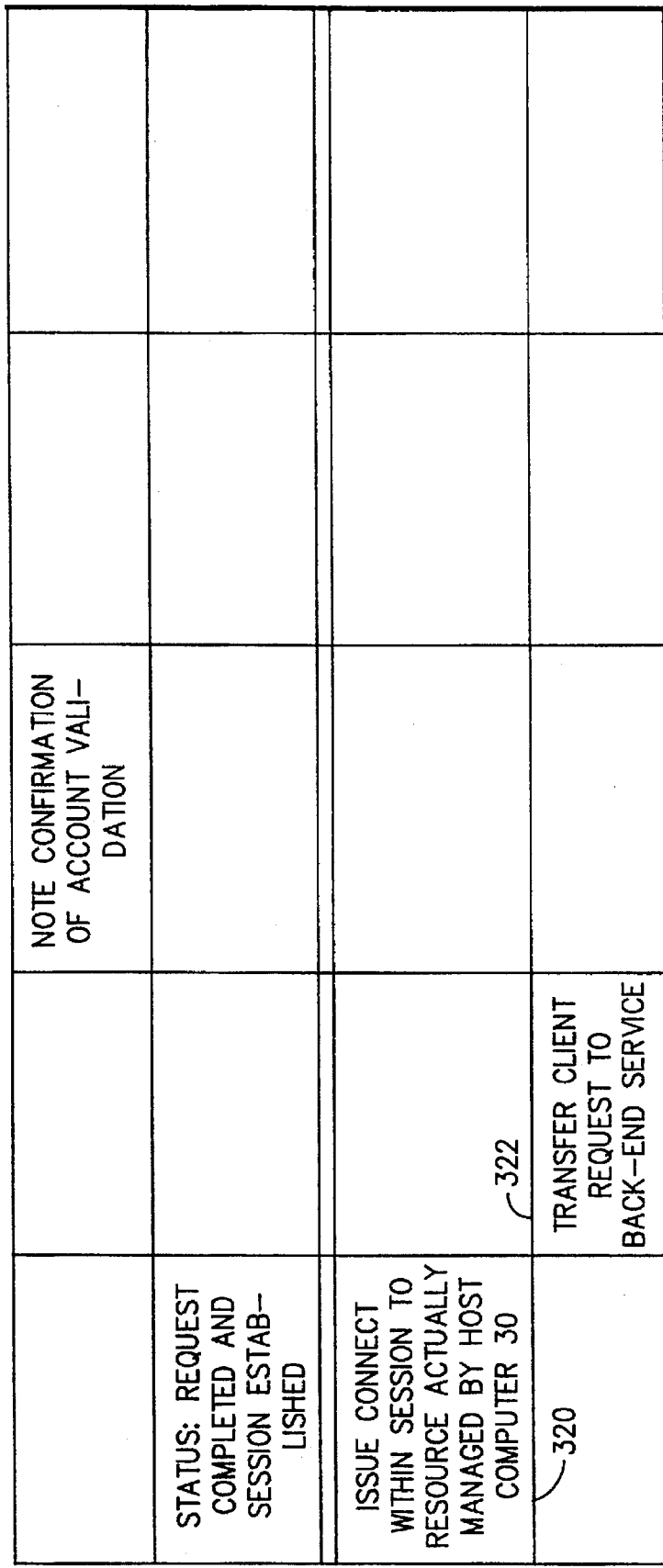
FIGS. 3(a–d) form a flow chart illustrating examples of operation of the network server and host computers of FIG. 1 in response to specific requests by the clients.
Figure 3A:
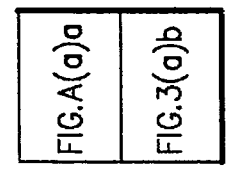
Figure 3C:
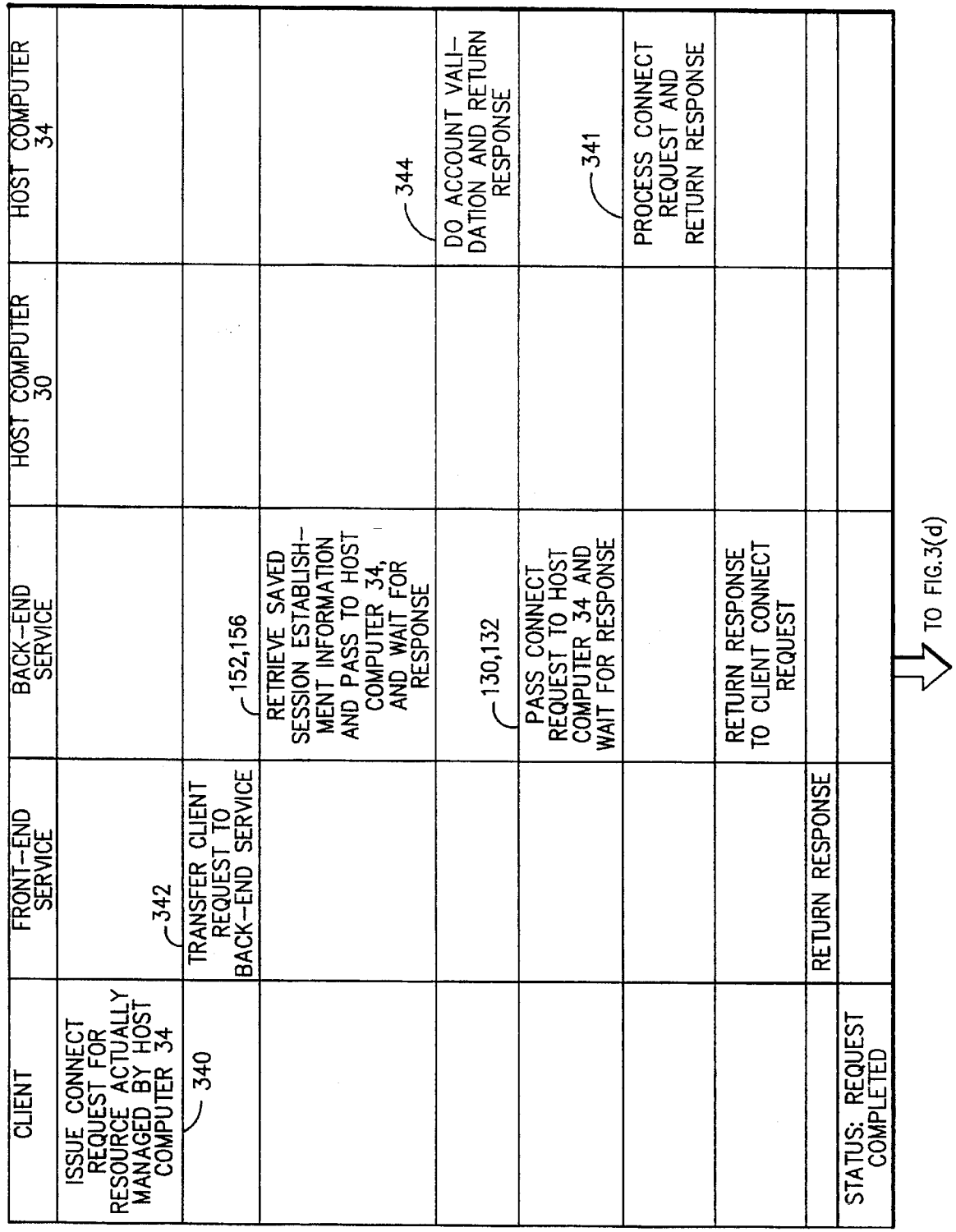

FIGS. 3(a–d) illustrate operation of the network server 14 (including the back end service described above) and associated host computers 30 and 34 in responding to five specific requests by one client 11a on network 13. In step 310, the client issues a bundled request for session establishment and connection to a resource such as a directory that happens to reside in local DASD 24. The front end service passes the request to the back end service (step 312), the back end service stores the establishment data in step 110 and sends the request to the front end service in step 116. Then the front end service establishes the session, processes the connect request, and notifies the back end service and the client of the session (step 314). Because the resource is not managed by either remote computer 30 or 34, the back end service does not attempt to establish a session with either remote computer 30 or 34.

In step 320, the client subsequently issues a connect request for a resource such as a directory that happens to reside on remote DASD 40 which is managed by host computer 30. The front end service passes the request to the back end service (step 322), and the back end service performs steps 152 and 156 described above in which the back end service requests that a session be established with host computer 30 and then waits for the response. This is necessary because the resource resides on remote DASD 40, and the session established in step 314 was confined to the network server. The host computer establishes the session (step 324), and then the back end service performs steps 130 and 132 described above in which the back end service sends the connect request to the host computer and waits for the response. Then, the host computer processes the connect request and responds to the back end service with the result (step 326). Then, the back end service sends the response to the client via the front end service (step 134).

In step 330, the client subsequently issues a request to connect to a second resource that happens to reside also on remote DASD 40. The front end service passes the request to the back end service (step 332), and the back end service sends the connect request to the host computer 30 (step 130). Because there is already a session established with host computer 30 for client 11a, it is not necessary to establish another session with host computer 30. Then the host computer 30 processes the connect request (step 334), and then the back end service returns the response to the client via the front end service (steps 132 and 134).

In step 340, the client subsequently issues a request to connect to a resource that happens to reside on the other remote DASD 44 which is managed by host computer 34. The front end service passes the request to the back end service (step 342), and the back end service executes steps 152 and 156 described above in which the back end service requests a session with host computer 34 for client 11a and then waits for a response. Then the host computer 34 establishes the session with the client 11a and responds with an acknowledgement (step 344). Such a session is necessary because the resource resides on remote DASD 44, and the sessions established earlier in steps 313 and 324 did not involve host computer 34. Then, the back end service passes the connect request to the host computer 34 and waits for a response (steps 130 and 132), the host computer 34 processes the request and returns a response (step 346). In step 134, the back end service forwards the response to the client via the front end service. It should be noted that the session with host computer 34 was not established until the client requested a connection to DASD 44; this optimizes efficiency.

In accordance with one object of the invention, an application program executing on the host computer 30 can access the same remote resource such as a directory on DASD 40 that the client can access. This is illustrated by step 348 in which a user application program 349 executing on host computer 30 (or coupled to the host computer 30 via a communication facility not shown) makes a request to the host processor to link the application program to a minidisk portion of DASD 40. This linkage provides the application program with access by resource name to all the resources on the minidisk including the directory that was accessed by the client. Thus, the application program can now read from or write to the directory and any file therein stored on the minidisk by open, read, write or delete, close and other commands.

In step 350, the client subsequently issues a request to terminate the session. It should be noted that the client need not know that sessions were established also with host computers 30 and 34. The front end service passes the request to the back end service (step 352), and the back end service executes steps 200–206 described above in which the back end service determines which host computers have an active session with this client, builds a session termination notification and sends it to each host computer which has an active session for this client. In this example, host computers 30 and 34 currently have an active session with this client. Then, the host computers 30 and 34 terminate their sessions with this client 11a (steps 354 and 356).

Figure 4A:
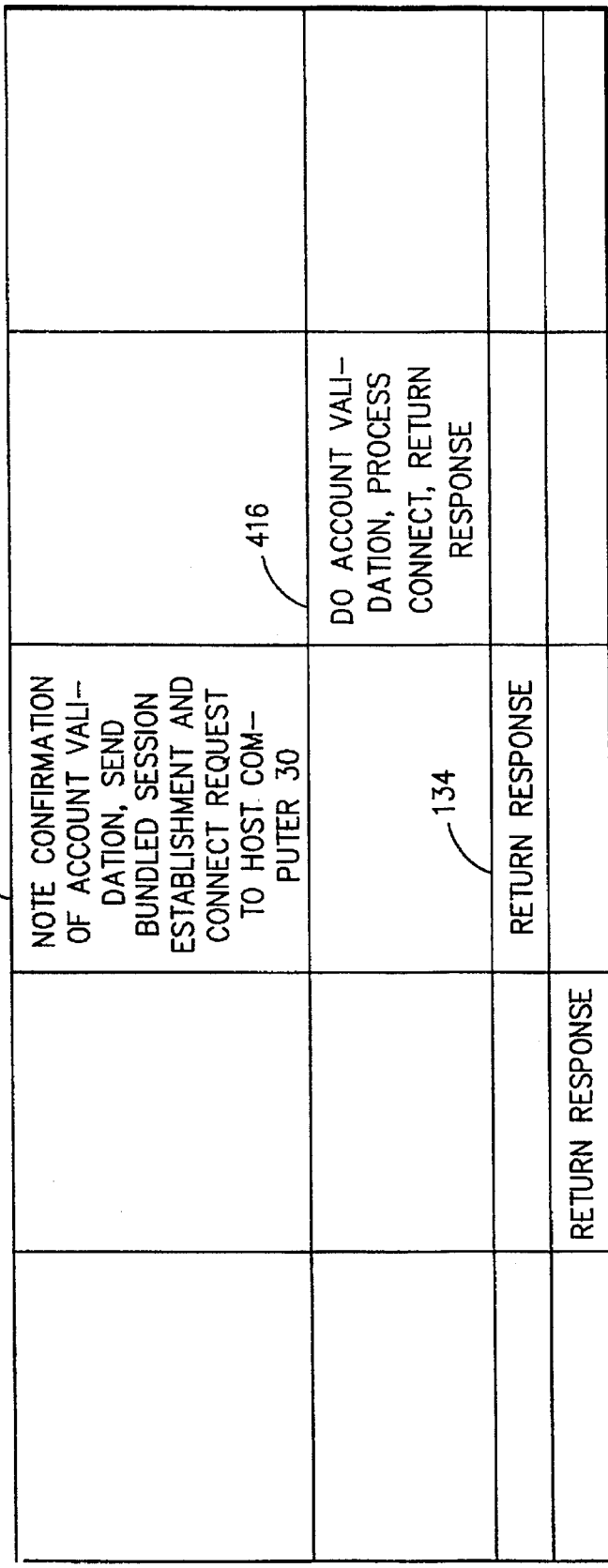
FIGS. 4(a) and 4(b) form a flow chart illustrating other examples of operation of the network server and host computers of FIG. 1 in response to other specific requests by the clients.
Figure 4B:
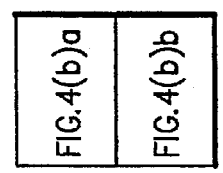

FIGS. 4(a) and (b) illustrate operation of the network server 14 (including the back end service described above) and associated host computer 30 in responding to three other specific requests by one client 11a on network 12. In step 410, client 11b, issues a bundled request for session establishment and a connection to a resource that happens to reside on DASD 40 which is managed by host computer 30. The front end service passes the request to the back end service (step 412), and the back end service saves the session establishment data and returns control to the front end service (steps 110 and 120). Then the front end service establishes the session, transfers control to the back end service and notifies the back end service that the session has been established (step 414). Next, the back end service executes steps 122 and 130 described above in which the back end service requests a session with host computer 30 for client 11b, and then host computer 30 establishes the session with client 11b, processes the connect request, and returns the result of the connect request processing to the back end service (step 416). Then, the back end service returns the result to the client via the front end service (step 134).

In step 420, the client 11b issues a connect request within the same session that was established in step 414 for a resource that happens to reside within local DASD 24. The front end service passes the requests to the back end service (step 422), and the back end service returns the request to the front end service because the request involves only local DASD 24 (step 116 described above). Then, the front end service processes the connect request (step 424). It is not necessary to establish any other sessions in view of the existing session with network server 14 for client 11b.

In step 430, the client 11b issues a request to terminate the session that was established in step 414, and the front end service passes the request to the back end service (step 432). Then, the back end service determines that a session currently exists for this client with host computer 30, builds a session termination notification based on the client request, and sends the notification to host computer 30 (steps 202, 208 and 210). It is not necessary to send the notification to host computer 34 because no session was previously established for client 11b on account of the requests made in FIGS. 4(a) and (b). In step 434, the host computer 30 terminates the session with client 11b.

Figure 5A:
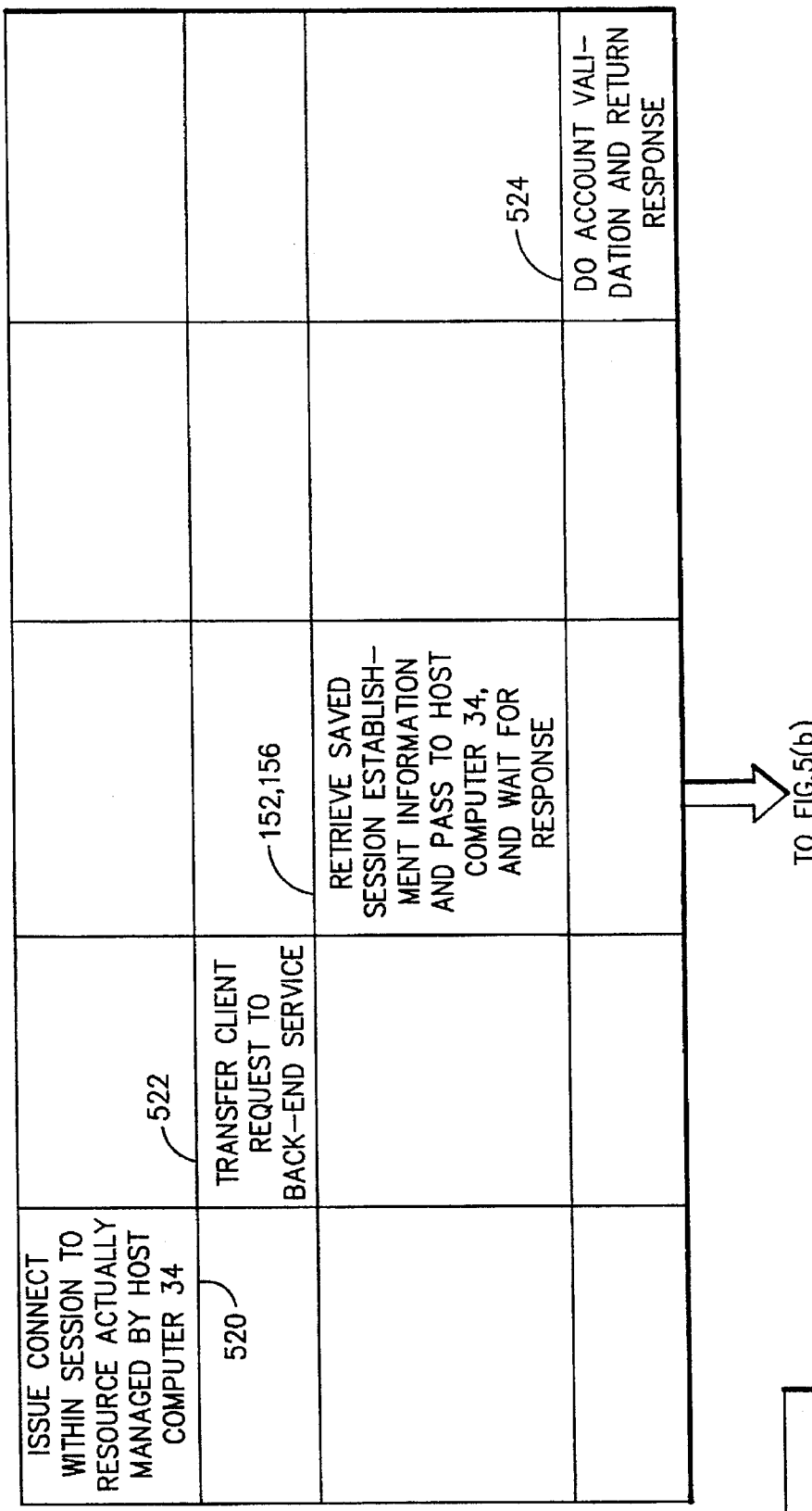

FIGS. 5(a) and (b) illustrate operation of the network server 14 (including the back end service described above) and associated host computers 30 and 34 in responding to three other specific requests by one client 11c on network 12. In step 510, client 11c issues a session establishment request to network server. The front end service passes the request to the back end service (step 512), and the back end service saves the session establishment data and returns the request to the front end service (steps 110 and 116). Because there is no request to connect to a resource on either remote DASD (or any resource), it is not necessary for the back end service to pass any request to either host computer 30 or 34. In step 514, the front end service establishes the session with client 11c, notifies the back end service of the session establishment, and returns a session establishment notification to the client 11c.

In step 520, the client 11c sends a connect request to the network server for a resource that happens to reside on DASD 44 which is managed by host computer 34. The front end service passes the request to the back end service (step 524), and the back end service builds a session establishment request based on the data stored in the session establishment data table, and sends the request to host computer 34 (steps 152 and 156). In step 524, host computer 34 establishes the session with client 11c and returns an acknowledgement to the session establishment request. Because the connect request does not involve host computer 30, the client requests are not sent to host computer 30 and host computer 30 is not interrupted in any way. After receiving the response from the host computer 34, the back end service passes the connect request to host computer 34 and waits for a response (steps 130 and 132). The host computer 34 processes the connect request and returns a response (step 524). The back end service forwards the response to the client via the front end service (step 134).

In step 530, the client 11c issues a request to the network server to terminate the session. The front end service passes the request to the back end service (step 532), and the back end service determines that host computer 30 has established a session with the client 11c, builds a session termination notification and sends it to the host computer 34. Because the host computer 30 was never involved with the client request of FIG. 5, the back end service does not send the session termination notification to host computer 30. In step 534, the host computer 34 terminates the session with client 11c.

The following is a detailed description of the channels 32 and 36, and the PCA card 28, although the present invention does not depend on the specific type of communication facilities which are utilized.

Each of the host computers 30 and 34 includes a host processor 70 and 74, a main memory 80 and 84, a "Blue" bus 90 and 94 servicing the host processor, the main memory, the Block Multiplexor channel 32 and 36, and DASD controllers 97 and 99 respectfully. DASD controllers 97 and 99 control the reading from and writing to the remote DASD 40 and 44 respectively, and are well known in the art.

Each channel includes a host port, a buffer memory to temporarily store all data transferred between the Blue bus and the host port, and a channel processor to control the data transfer from the main memory to the host port via the buffer memory. The channel relieves the host processor of the burden of transferring data between the main memory of the host computer and the host port, and once called by the host processor, is independent of the host processor.

To initiate a data transfer from the main memory to the host port, the host processor (under the direction of a host control program) builds a channel program including a sequence of channel command words (CCWs), and stores a channel address word at a predetermined location. The channel address word points to the first CCW in the channel program. Each CCW includes a command such as read or write, a byte length indicating the length of data to be read or written, and a pointer to the first location in main memory to store the data to be read in the case of a read CCW, or the first location of the data to be written in the case of a write CCW. Then, the host processor issues a Start I/O command which addresses the target device, in this case, the channel.

The channel processor receives the Start I/O command and fetches the first CCW. Pursuant to a single write CCW, the channel processor fetches a block of data from (host) main memory at a location indicated by the pointer and copies the data into the channel buffer memory. Next, the channel processor dispatches another task which executes on the channel processor to begin the transfer to the PCA card of the block of data that was recently copied into the channel buffer memory. Then, the channel processor processes subsequent write CCWs, if any, by fetching the corresponding blocks of data from the main memory and copying the data into the channel buffer memory.

The channel is corrected to the PCA card 28 by an IBM Bus and Tag cable. The Bus and Tag cable includes many parallel coaxial conductors to transmit data, address and control signals in parallel.

Figure 6:
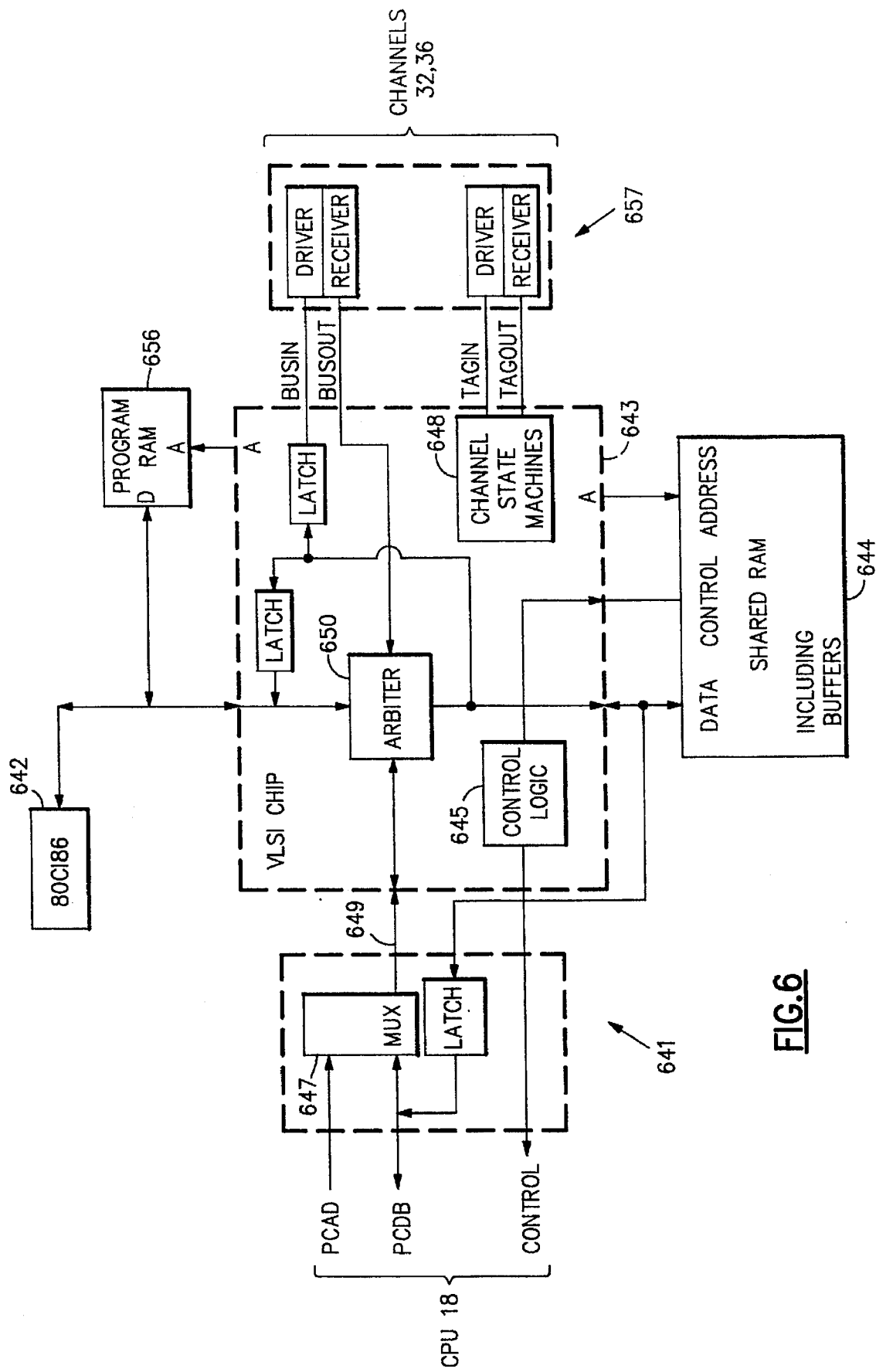
FIG. 6 is a block diagram illustrating a PCA adapter card within the network server of FIG. 1.

As illustrated in FIG. 6, the PCA card includes an Intel 80C186 microprocessor ("PCA processor") 642 and a shared RAM 644. The PCA processor 642 as well as the PS/2 processor 18 and channel state machine 648 (within the PCA card) can all directly access shared RAM 644 (with permission by arbiter 650). Shared RAM 644 includes a communication area for communication between the PS/2 processor 618 executing PCA driver code 630 and the PCA processor 642, and the transmit and receive data buffers to temporarily store all data transferred between a Micro Channel (R) bus associated with the PS/2 processor and the channel. A multiplexor 647 is located between shared RAM 644 and the Micro Channel (R) bus control logic 645 provides handshaking for the Micro Channel (R) bus and address latching for addresses supplied to the Micro Channel (R) bus. Channel state machine 648 provides channel protocol and control sequences for communication with the channel. Arbiter 650 arbitrates access to shared RAM 644 between the Micro channel (R) bus, the channel state machine 648, and the PCA processor 642. A program RAM 656 stores PCA processor microcode, and channel status and device information, and forms a command FIFO and a status FIFO described below.

Channel interface logic or remote port 657 includes drivers and receivers for interfacing to channel bus and tag lines. Micro Channel (R) interface logic 641 includes the multiplexer 647 and latches for interfacing to address and data lines on the Micro Channel (R) bus.

The following procedure is used to transfer data from the data buffer 69 of the PS/2 processor to the RAM 80 or 84 of the host processor with initiation from the PS/2 processor. First, the PS/2 processor obtains access to RAM 644 with permission from arbiter 650 in order to read a list in RAM 644 of available transmit data buffers. Neither the System/370 processor nor the channel participates in the decision where to store the data in RAM 644. Then, the PS/2 processor writes the data into an available data buffer in RAM 644. Next, the PS/2 processor sends a write command message with device address, buffer address and transfer size to the PCA processor 642 via the communication area in the shared RAM. The PCA processor processes the write command by setting up control parameters, i.e. attention status, buffer address, and transfer size in the program RAM table. The PCA processor then writes the device address corresponding to the channel into the command FIFO. The channel state machine 648 reads out the device address from the command FIFO and sends the attention status to the channel. The channel then interrogates the write command pending on the PCA card. Because of the channel protocol, the PCA will not send the data until a matching (read) command is received from the channel.

The channel subsequently responds to the write command from the PS/2 processor with a read command. The channel state machine matches the channel read command with the PS/2 write command and notifies the channel state machine of the match. Then, the channel state machine sets up the data buffer addresses and length count and controls the data transfer from the RAM 644 to the channel. Upon completion of the data transfer to the channel, the channel state machine writes an entry in the status FIFO to notify the PCA processor that the write operation has been completed.

The following procedure is used to transfer data from the data buffer 69 of the PS/2 processor to the RAM 80 or 84 of the host processor with initiation by the host processor. The host processor builds a channel program which includes a read CCW, and issues the Start I/O command to the channel. The channel fetches the read CCW, and sends a read command to the PCA card. Assuming that data is not waiting in the PCA buffer for transmission to the channel, the channel state machines 648 will return "command retry status" to notify the host processor that the data is not immediately available. After returning the command retry status, the channel state machine 48 writes an entry in the status FIFO to notify the PCA processor of the read command received from the channel. In response, the PCA processor notifies the PS/2 processor about the read command. When the PS/2 processor has data to send to the host processor, the PS/2 identifies an available buffer in RAM 644, and writes the data into the available buffer. Then, the PS/2 processor writes a message into the shared communication area of RAM 644 to notify the PCA processor of the existence and location of the data. In response, the PCA processor makes an entry into the command FIFO to notify the channel state machine of the write command from the PS/2 processor and the target device address. The channel state machine sends a "data ready" status signal to the channel, and the channel responds with the read command again. Finally, the channel state machine 648 controls the data transfer from the transmit buffer in RAM 644 to the channel buffer.

The following procedure is used to transfer data from the RAM 80 or 84 of the channel to the data buffer 69 of the PS/2 processor with initiation from the host processor. The host processor builds a channel program which includes a write CCW, and issues the Start I/O to the channel. The channel fetches the write CCW and corresponding data from the main memory, and stores the data in the channel data buffer. Then, the channel sends to the PCA card a corresponding write command. The channel state machine 648 obtains a data buffer from the shared RAM 644 by reading the list of available data buffers. (In the PCA system, it is not necessary to interrupt the PS/2 processor at this time.) Neither the System/370 processor nor the channel participates in the decision where to store the data in RAM 644. Then the channel state machine 648 controls the data transfer from the channel to the shared "RAM with the channel responding to control sequences established by the state machine 648. Upon completion, the channel state machine writes an entry into the status FIFO to notify the PCA processor about the receipt of the data from the channel and the location and length of the data in he receive buffer in RAM 644. The PCA processor reads out the entry from the status FIFO and then notifies the PS/2 processor via the communication area in the shared RAM. The PS/2 processor finally moves the data from the shared RAM into the PS/2 system RAM.

The PS/2 processor can also initiate transfer of data from RAM 80 or 84 of the host processor to the data buffer 69 of the PS/2 processor. First, the PS/2 processor obtains access to RAM 644 (with permission from arbiter 50) in order to read the list of available receive data buffers. Then, the PS/2 processor sends a read command message with device address, buffer address and transfer size to the PCA processor 642 via the communication area in the shared RAM. The PCA processor processes the read command by setting up control parameters, i.e. attention status, buffer address, and transfer size, in the program RAM table. The PCA processor then writes the device address corresponding to the channel into the command FIFO. The channel state machine 648 reads out the device address from the channel FIFO and sends the attention status to the channel. The channel then interrogates the read command pending on the PCA card. The channel subsequently responds to the read command with a write command. The channel state machine matches the channel write command with the PS/2 read command. Then, the channel state machine sets up the data buffer addresses and length count and control the data transfer from the channel to the RAM 644. Upon completion of the data transfer from the channel, the channel state machine writes an entry in the status FIFO to notify the PCA processor that the read operation has been completed.

Instead of using the PCA driver 630, PCA card 28 and channels 32 and 36, the following commercially available software and hardware can be used to provide two alternate configurations. An IBM Personal Workstation Communication Services/VM program can execute on the processor 18 to interface processor 18 and data buffer 69 to an IBM Token-Ring Network 16/4 Adapter/A (IBM part number 74F9410) which is located at the network server. The Token-Ring Network 16/4 Adapter/A is coupled to an IBM Integrated LAN adapter (IBM part number 6134 for an ES/9000 type of host computer and part number 6034 for a 9370 type of host computer) which is located at the host computer and interfaces to the host processor.

Alternately, the IBM VM Personal Workstation Communication Services (PWSCS) program executes on the processor 18 to interface processor 18 and data buffer 69 to an IBM Channel Emulator/A card (IBM part number 1674899) which is located at the network server. AN IBM 3088 multisystem channel communication unit interconnects the Channel Emulator/A card to the Block Multiplexor channel of the host computer. Other connectivities are also available with PWSCS program.

Based on the foregoing, a network server according to the present invention has been disclosed. However, numerous modifications and substitutions can be made without deviating from the scope of the present invention. For example, different type of networks, i.e. different clients and different network communication links, can be served by the network server, and the network server can interface to different types of remote computers. Also, the files can be stored on other types of repositories. Therefore, the invention has been disclosed by way of illustration and not limitation, and reference should be made to the following claims to determine the scope of the present invention.

We claim:

1. A method for managing access by clients in a network to a first, local resource managed by a network server and a second, remote resource managed by a remote computer logically and/or physically coupled to the network server, said method comprising the steps of:

sending from one of said clients to said network server a request to establish a session and a request to connect to or access the first resource, said session establishment request including an account name and password for said one client;

in response to the session establishment request, establishing by said network server a session between said network server and said one client, and storing said account name and password;

in response to the request to connect to or access said first resource, determining that said first resource is managed by said network server, and determining if said connection is available to said first resource;

subsequently, sending from said one client to said network server a request to connect to or access the second resource; and in response to said subsequent request to connect to or access said second resource, determining by said network server that said remote computer manages said second resource, sending a request by said network server to said remote computer to establish a session with said remote computer, said request including said stored account name and password, and sending a request by said network server to said remote computer to connect to or access said second named resource; and wherein said network server and said one client reside in respective computers separate from each other and said remote computer.

2. A method as set forth in claim 1 further comprising the subsequent steps of:

sending from said one client to said network server a request to connect to or access a third resource;

determining by said network server that another remote computer, logically and/or physically coupled to said network server, manages said third resource; and sending by said network server to said other remote computer a request to establish a session, said session establishment request including said stored account name and password, and a request to connect to or access said third resource.

3. A method as set forth in claim 1 further comprising the steps of:
validating by said remote computer said account name and password included in said session establishment request, and
establishing by said remote computer said session requested by said network server.

4. A method as set forth in claim 3 further comprising the steps of:
sending from said one client to said network server a request to terminate said session;
determining by said network server that said one remote computer is involved in said session;
sending by said network server to said one remote computer a request to terminate said session requested by said network server; and
terminating by said network server the session between said network server and said one client.

5. A method as set forth in claim 1 further comprising the steps of:
after said subsequent request, making a request by another application program executing within said remote computer to access said second resource; and
pursuant to said application program request by said other application program, providing access by said remote computer to said other application program to said second resource.

6. A method as set forth in claim 1 wherein the subsequent connect or access request sent by said one client to said network server specifies said second resource by name, but does not specify said remote computer or location of said second resource.

7. A method set forth in claim 1 wherein said request to establish said session and said request to connect to or access said first resource are provided by a single request.

8. A network server as set forth in claim 1 wherein said request to establish said session and said request to connect to or access said first resource are provided by a single request.

9. A method as set forth in claim 1 wherein said determining step and both said sending steps performed by said network server in response to said subsequent request are performed without another request including a password from said one client to establish a session.

10. A method as set forth in claim 1 wherein said request to connect to or access the second resource does not include and is not accompanied by an address or identifier of said remote computer.

11. A method as set forth in claim 1 wherein the network server computer is local to the one client computer.

12. A method for managing access by clients in a network to a local resource managed by a network server and a remote resource managed by a remote computer logically and/or physically coupled to the network server, said method comprising the steps of:
sending from one of said clients to said network server a request to establish a session and a request to connect to or access a first resource, said session establishment request including an account name and a password for said one client;
in response to the session establishment request, establishing by said network server a session with said network server, and storing said account name and password;
in response to the connect or access request, determining that said remote computer manages said first resource, sending a request by said network server to said remote computer to establish a session with said remote computer, said request including said stored account name and password, and sending a request by said network server to said remote computer to connect to or access said first resource;
subsequently, sending from said one client to said network server a request to connect to or access a second resource; and
in response to said subsequent request, determining that said network server manages said second resource, and determining whether said second resource is available; and wherein
said network server and said one client reside in respective computers separate from each other and said remote computer.

13. A method as set forth in claim 12 further comprising the step of establishing said session with said remote computer by said remote computer validating said account name and password, in response to said session establishment request from said network server.

14. A method set forth in claim 12 wherein said request to establish said session and said request to connect to or access said first resource are provided by a single request.

15. A method as set forth in claim 12 wherein both of said determining steps performed in response to said subsequent request are performed without another request including a password from said one client to establish a session.

16. A method as set forth in claim 12 wherein said request to establish the first said session and said request to connect to or access the first resource do not include and are not accompanied by an address or identifier of said remote computer.

17. A method as set forth in claim 12 wherein the network server computer is local to the one client computer.

18. A network server for managing access by clients in a network to a first, local resource managed by the network server and a second, remote resource managed by a remote computer logically and/or physically coupled to the network server, said network server comprising:
means for receiving from one of said clients on said network a request to establish a session and a request to connect to or access the first resource, the session establishment request including an account name and password for said one client;
means, responsive to the session establishment request, for establishing a session between said network server and said one client, and storing said account name and password;
means, responsive to the request to connect to or access said first resource, for determining that said first resource is managed by said network server, and determining if said connection is available to said first resource; and
means, responsive to a subsequent request from said one client to connect to or access the second resource, for determining that said remote computer manages said second resource, sending a request to said remote computer to establish a session with said remote computer, said request including said stored account name and password, and sending a request to said remote computer to connect to or access said second resource; and wherein
said network server and said one client reside in respective computers separate from each other and said remote computer.

19. A network server as set forth in claim 18 wherein:

the determining means is responsive to another request from said one client to connect to or access a third resource to determine that another remote computer, logically and/or physically coupled to said network server, manages said third resource; and the sending means sends to said other remote computer a request to establish a session, said session establishment request including said stored account name and password, and a request to connect to or access said third resource.

20. A network server as set forth in claim 18 further comprising:

means, responsive to a request from said one client to terminate said session, for determining that said one remote computer is involved in said session;

means for sending to said one remote computer a request to terminate said session requested by said network server; and means for terminating the session between said network server and said one client.

21. A network server as set forth in claim 18 wherein the subsequent connect or access request sent by said one client to said network server specifies said second resource by name, but does not specify said remote computer or a location of the resource managed said remote computer.

22. A network server as set forth in claim 18 wherein the means responsive to said subsequent request performs its determining function and both of its sending functions without another request including a password from said one client to establish a session.

23. A network server as set forth in claim 22 wherein said subsequent request to connect to or access the second resource does not include and is not accompanied by an address or identifier of said remote computer.

24. A network server as set forth in claim 18 wherein said subsequent request to connect to or access the second resource does not include and is not accompanied by an address or identifier of said remote computer.

25. A network server as set forth in claim 18 wherein the network server computer is local to the one client computer.

26. A network server for managing access by clients in a network to a local resource managed by the network server and a remote resource managed by a remote computer coupled to the network server, said network server comprising:

means for receiving from one of said clients on said network a request to establish a session and a request to connect to or access a first resource, the session establishment request including an account name and a password for said one client;

means, responsive to the session establishment request, for establishing a session with said network server, and storing said account name and password;

means, responsive to the connect or access request, for determining that said remote computers manages said first resource, sending a request to said remote computer to establish a session with said remote computer, said request including said stored account name and password, and sending a request to said remote computer to connect to or access said first resource; and means, responsive to a subsequent request to connect to or access a second resource, for determining that said network server manages said second resource, and determining whether said second resource is available; and wherein said network server and said one client reside in respective computers separate from each other and said remote computer.

27. A network server as set forth in claim 26 wherein the means responsive to said subsequent request performs both of its determining functions without another request including a password from said one client to establish a session.

28. A network server as set forth in claim 23 wherein said request to establish the first said session and said request to connect to or access the first resource do not include and are not accompanied by an address or identifier of said remote computer.

29. A network server as set forth in claim 26 wherein said request to establish the first said session and said request to connect to or access the first resource do not include and are not accompanied by an address or identifier of said remote computer.

30. A network server as set forth in claim 26 wherein the network server computer is local to the one client computer.

31. A method for managing access by clients in a network to a remote resource managed by a remote computer logically and/or physically coupled to a server of said network, said method comprising the steps of:

sending from one of said clients to the network server a request to establish a session and a request to connect to or access the remote resource, said session establishment request including an account name and a password for said one client;

in response to the session establishment request, establishing by said network server a session with said network server, and storing said account name and password; and in response to the connect or access request, determining that said remote computer manages said remote resource, sending a request by said network server to said remote computer to establish a session with said remote computer, said request including said stored account name and password, and sending a request by said network server to said remote computer to connect to or access said remote resource; and wherein said network server and said one client reside in respective computers separate from each other and said remote computer.

32. A method as set forth in claim 31 wherein the network server computer is local to the one client computer.

33. A network server for managing access by clients in a network to a remote resource managed by a remote computer logically and/or physically coupled to said network server, said network server comprising:

means for receiving from one of said clients on the network a request to establish a session with said network server and a request to connect to or access the remote resource, said session establishment request including an account name and a password for said one client;

means, responsive to the session establishment request, for establishing said session with said network server, and storing said account name and password; and means, responsive to the request to connect to or access the remote resource, for determining that said remote computer manages said remote resource, sending a request by said network server to said remote computer to establish a session with said remote computer, said request including said stored account name and password, and sending a request to said remote computer to connect to or access said remote resource; and wherein said network server and said one client reside in respective computers separate from each other and said remote computer.

34. A network server as set forth in claim 33 wherein the network server computer is local to the one client computer.

35. A computer program product for instructing a network server computer to manage access by a client in a network to a remote resource managed by a remote computer logically and/or physically coupled to said network server computer, said computer program product comprising:

a computer readable medium;

first program instruction means for instructing the network server computer to receive from said client a request to establish a session with the network server computer and a request to connect to or access the remote resource, said session establishment request including an account name and a password for said client;

second program instruction means for instructing the network server computer to respond to the session establishment request, by establishing said session with said network server computer, and storing said account name and password; and third program instruction means for instructing the network server computer to respond to the request to connect to or access the remote resource, by determining that said remote computer manages said remote resource, sending a request from said network server computer to said remote computer to establish a session with said remote computer, said request including said stored account name and password, and sending a request to said remote computer to connect to or access said remote resource; and wherein said client resides in a computer separate from said network server computer and said remote computer; and said first, second and third program instruction means are recorded on said medium.

36. A computer program product as set forth in claim 35 wherein said first, second and third program instruction means are recorded on said medium in executable form.

* * * * *